United States Patent [19]

Sich

[11] 4,421,016
[45] Dec. 20, 1983

[54] COOKING APPARATUS

[76] Inventor: Mirko H. Sich, 70 Dudley Ave., Daw Park, Australia 5041

[21] Appl. No.: 371,251

[22] Filed: Apr. 23, 1982

Related U.S. Application Data

[62] Division of Ser. No. 179,796, Aug. 20, 1980, abandoned.

[51] Int. Cl.³ .............................................. A47J 37/07
[52] U.S. Cl. .................... 99/402; 99/421 P; 99/427; 126/41 B
[58] Field of Search ............... 99/402, 427, 397, 396, 99/443 R, 421 H, 421 P; 134/142, 153, 159; 126/41 B

[56] References Cited

U.S. PATENT DOCUMENTS

| | | | |
|---|---|---|---|
| 2,039,541 | 5/1936 | Lekometros | 99/421 P |
| 2,576,028 | 11/1951 | Mitchell | 99/397 |
| 2,760,428 | 8/1956 | Boyajian | 99/427 |
| 3,025,782 | 3/1962 | Stall | 99/402 |
| 3,316,831 | 5/1967 | Koland et al. | 99/443 R |
| 3,802,331 | 4/1974 | Zickefoose | 99/427 |

Primary Examiner—Billy J. Wilhite
Attorney, Agent, or Firm—Pearne, Gordon, Sessions, McCoy, Granger & Tilberry

[57] ABSTRACT

A barbecue in which there is a deep box with means in the base to hold burning coals and means to effect continuous turning of a food holding means arranged so that food is held in pieces and is balanced in symmetrical manner about the pivot axis and the food is carried deep within the box for part of the rotational path so as to provide jointly for basting and for secondary heating by radiation from the sides of the box.

11 Claims, 9 Drawing Figures

COOKING APPARATUS

This is a division of application Ser. No. 179,796, filed Aug. 20, 1980, now abandoned.

This invention relates to apparatus for cooking.

BACKGROUND OF THE INVENTION

It is known that a preferable technique in cooking involves the use of burning coal and to cook or barbecue food by holding this above the burning coals and to some extent having inflammable by-products resulting from the cooking flare by being inflamed when hitting the burning coals and this technique for grilling, especially meat, is well known and indeed conventional.

This technique however suffers from several problems among which is the difficulty that it can be difficult to control the degree of flaming and the outside of the food can be overcooked or burned or charred because of excess fat resulting from heating of the food dropping into the burning coals.

Conversely if there is insufficient fat, the food can have substantially all of the fat removed and this can therefore be considered as dried out and of course one of the skills of cooking with this type of technique is to keep the food both moist, correctly cooked through, and not excessively charred on the outside.

A further difficulty is the problem experienced by those who attempt to provide significant quantities of food cooked to these standards typically commercial caterers, who wish to offer the advantage considered to be offered by cooking over hot coals rather than other forms of heating and suffer the further difficulty then of being able to provide significant quantities of food within a short period of time correctly cooked and yet do not wish to have excessive quantities of equipment that they must take from location to location if it is a portable hire concept nor in terms of costs associated with providing of coals do they also want large fire beds if this can be avoided nor do they want, if this can be avoided, to have to individually tend any cooking of food on a very often basis.

Perhaps a typical previous installation and method of cooking can be considered in which a fire is lit and kept burning within a half cylinder and positioned significantly above both the fire and the sides of the container holding the fire is the food to be cooked which may typically be the carcass of an animal such as a sheep or a pig and this is cooked very slowly and to assist in reducing charring the pig is rotated generally about its own longitudinal axis and preferably some moistening fluid is added in the form of basting from time to time.

The period of time normally associated with such method of cooking is very long indeed and some ten to twelve hours would be perhaps typical, it is conventional that the outside of the food is charred often to the stage of being inedible, and there is an associated risk because of the low temperatures involved and the long time involved, that some of the food especially that susceptible to bacterial contamination may by reason of such bacterial growth promoted by the conditions and not overcome because of the low temperatures, become dangerous to the health of those who may afterwards eat the food. The trauma and economic cost of such problems will be well known to those who might have experienced this difficulty.

CONCEPT OF THIS INVENTION

A first aspect of this invention is the realisation that while a source of heat in respect of grilling of food is the live coals themselves, nonetheless a significant heating effect of the food is achieved by the secondary radiation of the sides of the container which of course effect a heating of the food from many different directions than that provided by the mere coals themselves.

Accordingly, it is the concept therefore in the first instance of providing that the food is not only above burning coals but that at least for a significant period of time it is within and between sides defining a container for holding of the coals which are themselves subject to heating by the coals and provide therefore the secondary heating effect providing a significant increase in the efficiency of the heating of the food.

Furthermore, because the heating is not as severe as the primary source of heating, the food while being cooked with the longer infra-red rays does not take on the rapid surface burning or charring usually associated with this type of cooking so rapidly.

The next aspect of this invention relates to the problem of fat which is normally melted from the food and which is normally allowed to drop directly onto the coals providing to some extent the charring and perhaps flavouring of the food.

It is in fact now realised that only a small proportion of this fat is necessary for this effect and it is far better if in some way most of the fat can be recirculated around the food so that while it is heated it nonetheless is used further to continue heating of the food sealing this and providing additional entrapment of moisture so that the food becomes a much moister end cooked product.

To provide these features, according to this invention, there is provided a barbecue of a type including means to hold food to be cooked above a heat source, characterised according to this invention in that there is provided a deep box comprising confining sides and a base, means within the base to support burning coals across the base to provide a heat source, and food holding means being pivotally supported with respect to at least several of the sides of the deep box and adapted to hold separate pieces of food symmetrically about the pivot support axis of the food holding means the arrangement being such that during rotation of the food holding means about its pivot support axis, the food held thereby will be carried through substantially half its path below the perimeter and between the surrounding sides and for the remainder above the perimeter of the said sides, and means to effect continuous rotation of said food holding means about its pivot support axis.

This presumes that the sides defining the deep box are subject to the heating from the hot coals or other heating source within the box and accordingly provide the secondary radiation effecting such beneficial secondary heating.

This also presumes that the food holding means are supported at or about the upper perimeter of the sides so that any means holding the food will rotate so as to be, for approximately half of the circular path that each part of food will travel, below the upper perimeter of the sides and therefore effectively between the sides defining the deep box and therefore more effectively subject to the effect of infra-red heating caused by the secondary heating effect offered thereby.

In a preferred arrangement, the means providing for holding of the food are of a grid character and arranged so that the food is held between two meeting grids and generally the dimensions of each grid are such that these will neatly fit between the respective parallel sides defining the sides of the deep box.

Two or more separate and integral food holding means can be included within one deep box but insofar that there are such two or more separate food holding means, the area covered by each grid to one side of an axis defining the pivot support axis for the food holding means is such that such grid will fit reasonably neatly between the respective sides of the deep box.

In a preferred arrangement, there are four such grids which might be termed separate arms extending radially and symmetrically about the pivot support axis of the food holding means each of these perpendicularly related one with respect to the other and in this way there are four separate grids which as the food holding means rotates will hold food in such a way that generally at least half of the food is below a supporting perimeter of any deep box upon which it is pivotally supported so as to be positively subjected to radiation from the sides defining the deep box and secondly, any fat dripping from food above will generally encounter food below so that there will be a significant re-basting by cooking food which will significantly limit loss of fat and other cooking fluids during the cooking process.

A significant discovery in relation to this method of cooking and of course apparatus intended to use this method of cooking is the fact that surprisingly, food along the outer edges of the grids, that is that which will be closest during the lowest point in the path or rotation, to the burning coals, does not appear to be cooked at any significantly greater rate than that food which is closer to the axis of rotation.

The food in each case of course is subjected to approximately the same proportion of secondary heating from the sides and also while the outer located food is closer to the strong heat course of the cooking coals for a short period of time, it would seem that it is also equally subject to the significantly higher cooling effect while above the deep box and these two things especially because of the rotation, the protective influence of the fat dripping onto this food from other food and to a large extent most of the real heating effect is achieved from the secondary heating, seems to provide an averaging effect which makes the system particularly beneficial.

Significant advantages have been achieved not only with respect to the general principle but by providing specific features which are of advantage in achieving this arrangement.

Preferably then, when there are four cooking grids arranged symmetrically about the pivot support axis, there is advantage if each of the grids is separately removable from a support frame so that food being placed in position or being removed after being cooked can be separately removed or separately placed in position with respect to the other arms.

There has also been found to be advantage if the position of the grids can be adjusted relative to an axis parallel to the pivot support axis of the food holding means overall in that while in general terms the rate of cooking at the outer edges of the grid may not be significantly different from that within the closer areas with respect to the pivot support axis, nonetheless there can be some and where this is very important, it has been found preferable that the grids themselves be located so that their general planar relationship rather than being aligned radially with respect to the pivot support axis, is changed and perhaps is located perpendicularly with respect to the said pivot support axis.

Obviously, there are other configurations providing means by which food can be supported including two, three, four or more sides each case being symmetrically arranged relative to a support axis.

Perhaps according to a further form of the invention then this can be said to reside in apparatus for cooking food including four sides and a base providing a rectangular deep box with means within the box to support across the bottom of the box burning coals, means to support a plurality of separate pieces of food to be cooked and comprising four metal grids each supported in a removable manner with respect to a pivotally supported support frame the support frame including toward each end four arms in radially extending and perpendicular relationship each arm providing support for an end of each grid, the support frame being supported at the upper perimeter rim of two of the oppositely positioned sides, and motor drive means interconnected with the support frame to effect a continuous rotation of the support frame about the pivot support axis whereby to carry any food held by each grid for substantially half its path to below the perimeter and between the sides defining the box and for the remainder of the path above the perimeter and above the sides.

Further features and explanation of the invention will be gained by reference both to the description of the preferred embodiments following hereafter and to the claims appended to the specification.

To assist in a fuller understanding of this invention, reference shall now be made to several preferred embodiments the description being made with the assistance of drawings attached to the specification and in which.

Figure 1:
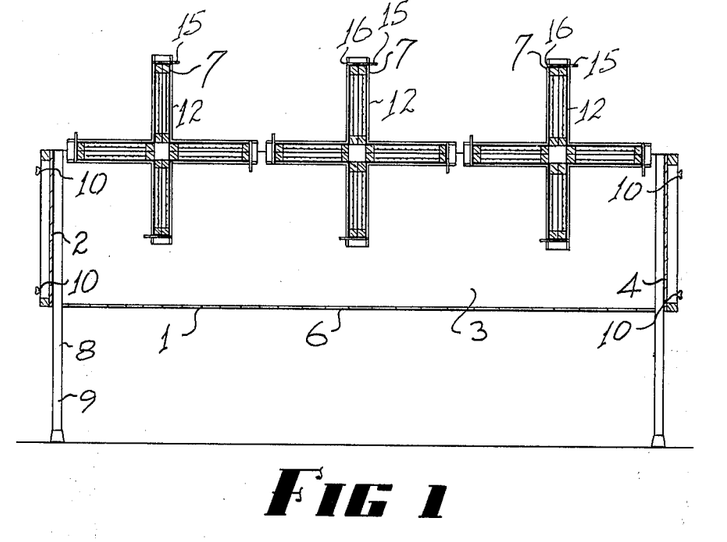
FIG. 1 is a cross-sectional view through a barbecue of the type incorporating the invention according to the first preferred embodiment and incorporating three separate food holding means.
Figure 2:
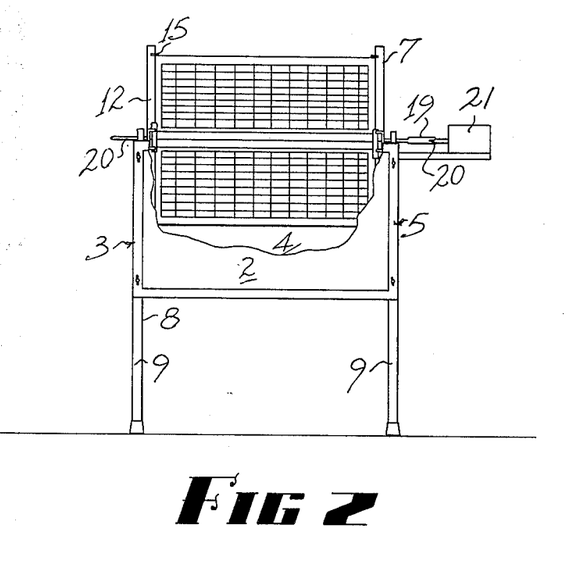
FIG. 2 is a view from an end of the apparatus as shown in FIG. 1 with part of the end wall of the fire box being partly cut away to show more detail of the food holding means.
Figure 3:
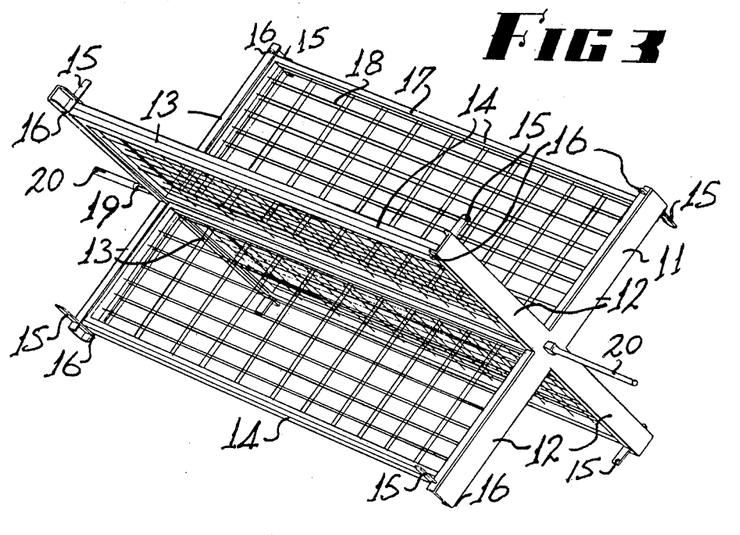
FIG. 3 is a perspective view of one of the food holding means as shown in both FIGS. 1 and 2 according to the first preferred embodiment, in this case the food holding means being shown separate from the supporting box.

Referring now to the first embodiment as illustrated with respect to FIGS. 1, 2 and 3, there is shown especially in FIGS. 1 and 2 a deep box 1 comprised of sides 2, 3, 4 and 5 these being arranged so as to provide a rectangular confining space so that with the base member 6 there is provided this deep box 1 across the base of which can be supported burning coals.

The burning coals can be placed directly on the base 6 or they can be supported in a tray which is not shown but in any event, the burning coals are generally distributed across the base fully so that the hot gases and radiant heat will firstly rise or cause air carrying this heat to rise, and there will also of course be the secondary heating of the sides, namely the sides as defined, which in each case are made from the preferred embodiment, an enamelised black metal.

The structure of the box is such as to provide that the food cooking means 7 of which there is shown to be three are supported at a reasonable height for a cook, is achieved by supporting each of the sides relative to a support frame 8 which includes legs 9 to which each of the sides is supported in the case of the side 2 by bolts secured by wing nuts shown at 10.

In the arrangement shown, the assembly can be dismantled to provide for portability.

Of specific interest however is the arrangement of each of the food holding means 7 and in each case this includes a support frame 11 which includes at each end four arms at one end these being shown at 12 and at the other 13 each of the arms as shown being in a radially extending and perpendicular relationship one with respect to the other and each arm being such as to provide support for an end of each of the grids 14.

Each of the arms 12 and 13 are comprised of U-shaped sections or channel sections by which each of the grids can thereby slide into position and each of the grids 14 are kept in position by means of a pivotally secured keeper plate 15 the keeper plate 15 being pivotally secured at location 16.

Each of the grids 14 include a perimeter frame 17 and a wire mesh 18 there being two separable halves of each grid 14 so that separate pieces of food can be engaged between the metal mesh and can be held thereby with respect to the metal grid which in turn of course is held with respect to the support frame 11 in the manner shown.

The two wire meshes with each having their perimeter frame are held together in any convenient manner and especially if located within the channels providing the arms 12 then these channel sections will also provide the means to hold the two sections providing the wire grid in place.

The food holding means also include outwardly extending pivot support arms 19 and 20 which are each adapted to rest upon the perimeter rim of the deep box 1 and the arm 19 has at an outer end a slot 20 adapted to fit within a drive connection from an electric motor 21 by which the whole of the food holding means in each case is rotated about the pivotal support axis.

It will be observed especially when looking at FIG. 1 that the area over which each of the grids covers is generally co-extensive with respect to the cross-sectional area of the deep box and furthermore each arm is also related to the depth of the deep box 1 so that while it can rotate down and into the box and between the respective sides 2, 3, 4 and 5 and thereby provide that the food will be subjected to the secondary radiation from the sides of the box nonetheless it is also clear of what might be an expected height of burning coals within the base 6 of the deep box shape.

According to a second embodiment, the same deep box as is shown in the first embodiment and specifically in FIGS. 1 and 2 is used in the second embodiment except that the food holding means instead of having three independently rotatable arrangements now comprises one single arrangement having however the four separate grids.

Figure 4:
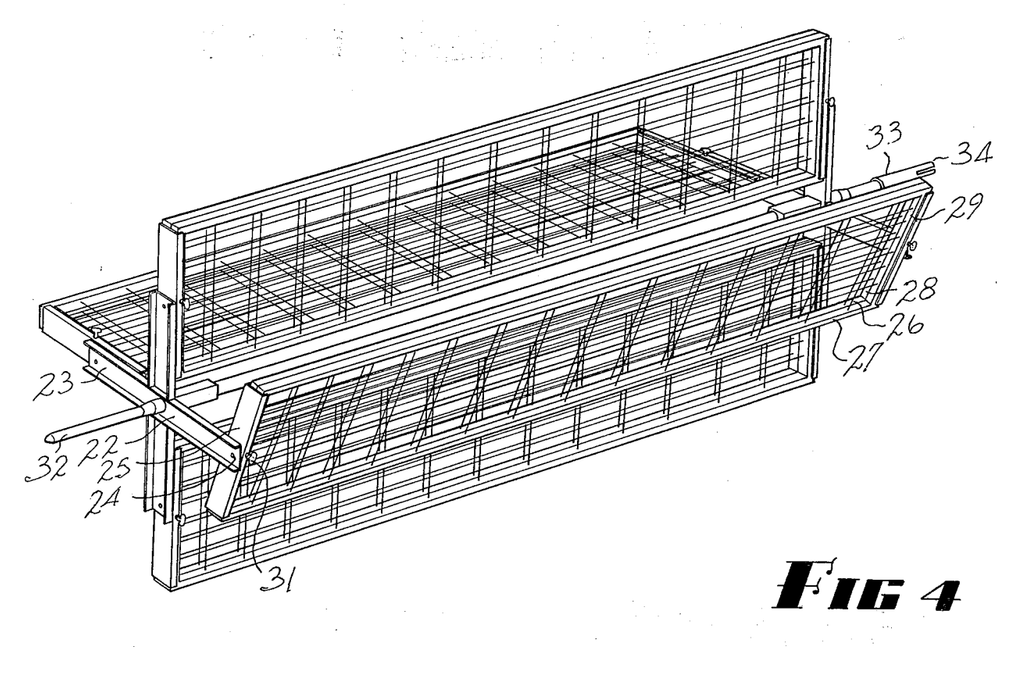
FIG. 4 is a perspective view of a food holding means according to a second preferred embodiment this being a food holding means adapted to fit fully along the box shown in relation to FIGS. 1 and 2.

This of course is shown in FIG. 4 and it will be seen in this case that the support frame 22 includes at each end four arms 23 each of which is of channel shape and each of which supports in pivotal manner by means of pivot support 24 a channel shaped support member 25.

The food holding grid 26 includes two portions each separable one with respect to the other and each including a perimeter frame in the case of one 27 and in the case of the other 28 each of which are generally identical and which each include a wire mesh 29 and 30 so that when the two come together they can hold therebetween separate pieces of food typically chickens or steak or chops and so on.

The food holding grid 26 is adapted to fit by sliding within the food channel shaped member 25 and to be held therein by means of interlocking screw member 31.

It will be seen that the support frame also includes at each end pivotal support arms 32 and 33 which include interlocking slot 34 by which an electric motor which of course not shown can be interconnected therewith and a drive effected.

In accord with a third embodiment, the means holding the separate pieces of food can be as shown in FIG. 5 in which once again the apparatus shown is intended to be used with the deep box as is shown with respect to FIGS. 1 and 2 although in this case as in the last embodiment it is intended that this be used in the direction of elongation of the box.

Figures 5, 6, 7:
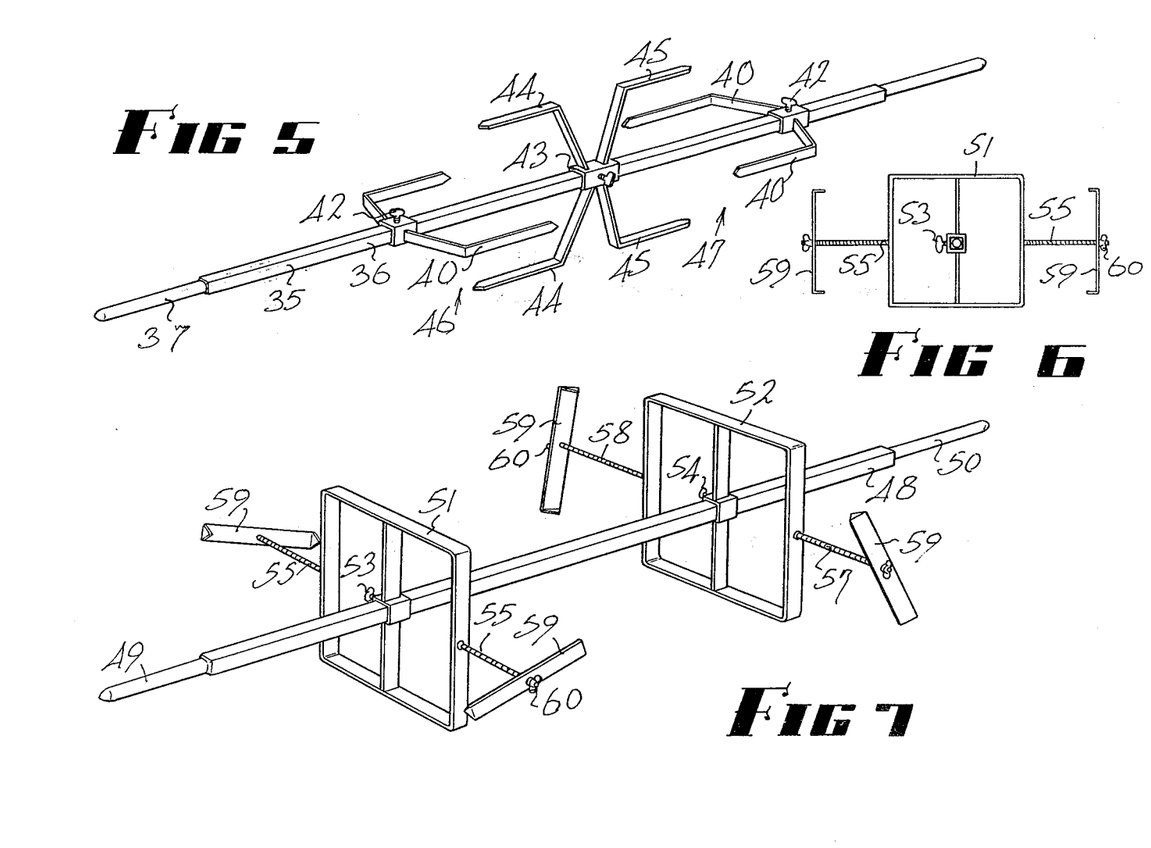
FIG. 5 illustrates a food holding arrangement according to a third preferred embodiment.
FIG. 6 is an end view of a further food holding means according to a fourth embodiment.
FIG. 7 is a perspective view of this fourth embodiment.

Accordingly, the food support frame 35 includes a square cross-sectional member 36 and at each end a circular cross-section arm 37 and at the other end 38 with an appropriate interlocking slot 39 by which a motor drive can be connected to continuously rotate the member.

Slidably interconnected on the square rod are interlocking arms 40 with a boss 41 having a squared aperture with a screw bolt threadably engaging and holding the arms 40 with respect to the square rod 36.

In order to hold a number of separate pieces of food it is important to have separate arms and an arrangement such as that shown in 43 is of value providing two sets of arms 44 and 45 each of these being directed in an opposite direction to provide interlocking coupling with food on the one hand with the arms of the unit 46 or on the other with the unit at 47.

The length of the arms, that is typically 45, 46 or 40 is selected once again with relation to the shape of the deep box and such that the food first of all will be symmetrically held about the pivot axis as defined by the axis passing along the direction of elongation of the square rod 35 and the end arms 36, 37 and 38.

It is of course to be stressed that the feature here is that this is in relation to a burning coal or charcoal type grill or barbecue which has specific problems although it is considered this has specific value in relation to food treatment.

The problems are directly related to commercial exploitation of the concept of charcoal barbecues and hence the difficulties are different from those that might be associated with other types of cooking of food.

Typically therefore it must be emphasised that we are talking about pieces of food which are the pieces of food actually carried below the pivot point rather than merely circulating a piece of food about its own centre in the more conventional way.

Referring now to the next embodiment this shows the apparatus by which other pieces of food can be more conveniently held typically larger pieces of meat can be held and still achieve the object of this invention.

In this case there is once again a support rod 48 which is of square cross-section with the ends being of round cross-section at 49 and 50.

Arranged to be supported in interlocking manner is a support frame 51 and 52 which is secured in position by means of screw threaded manually tightenable bolt 53 and 54.

At an outer extension of the frame either 51 or 52 there is secured an outwardly extending screw threaded rod 55 and 56 in the one case and 57 and 58 in the other each of these having a sharp outer end adapted to skewer through food and having a keeper plate in each case 59 adapted to be held and tightened onto the food by means of wing nut 60.

In this way once again two long and large pieces of meat or other food to be barbecued can be held at an extended position relative to the support axis about which the whole arrangement is intended to pivot that is with respect to support relative to the upper perimeter rim of the deep box as shown in FIGS. 1 and 2 and the food in this case once again will be seen both to then with constant rotation proceed both below the perimeter rim of the sides and therefore be subjected in an all round manner to the secondary radiation from these sides, further, a lot of the fat dripping from the cooking food from one article of food will tend to drip onto the other and at the same time as explained, there seems to be no excessive charring or burning associated with holding some part of the food closely to the burning coals for a period of time that it takes to pass in a rotational step.

With respect to the embodiments now described it will be appreciated that typically with the last embodiment, an additional two skewers and support locations can be located with respect to the reverse position, that is at 90 degrees or perpendicularly to those shown and also of course with respect to the grids held in a pattern around the circular axis, whereas four have been shown the numbers can be varied provided they are symmetrically arranged around the pivot axis and there is sufficient room between each to both provide for axis by way of the secondary radiation as well as the gases being heated by the coals and there are means by which the food can be easily withdrawn from the members or replaced from time to time.

A feature of the arrangement described in each case is that insofar that the food is being brought out from between the sides from time to time, it makes it very easy for a cook to judge how far the meat has progressed in cooking and it is therefore very easy to supervise one or a number of these units.

Figure 8:
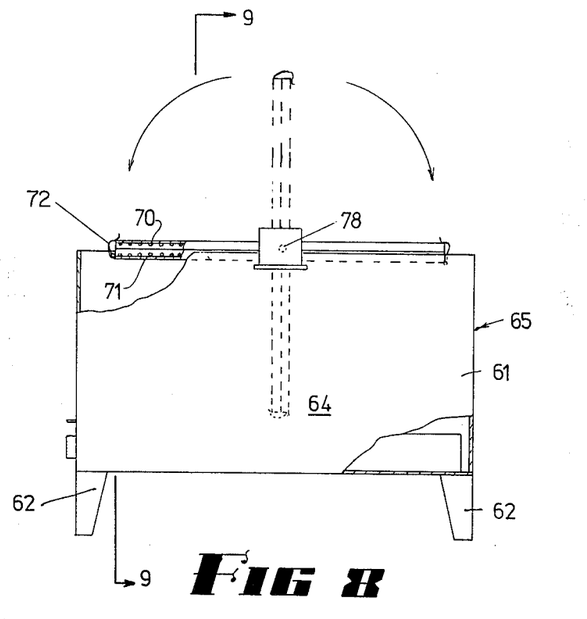
FIG. 8 is a side elevation with part cut away in this case.
Figure 9:
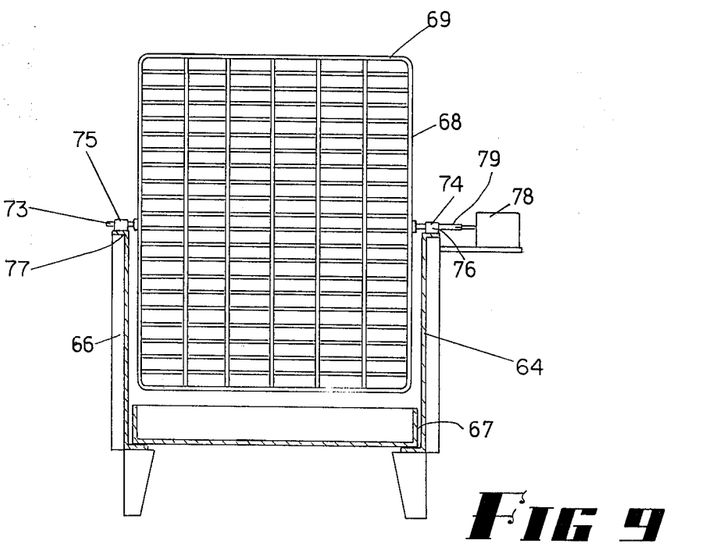
FIG. 9 is a cross-sectional view along the lines 9—9 with however the food holding means in this case being shown in a raised position, that is aligned so that its general planar shape is substantially vertical as is shown in dotted outline in FIG. 8.

Referring now to the fifth embodiment as illustrated in FIGS. 8 and 9, there is shown in this case a deep box 61 which is generally formed from sheet metal and which has integral legs 62 affixed therebelow.

There are of course four sides shown at 63, 64, 65 and 66 and the base in this case is provided by a separable tray 67 which is adapted to hold burning coals across the base thus formed.

The sides are of course as shown relatively deep and being of metal are heated by burning coals within the tray 67 so as to provide the secondary heating.

The means for holding food comprise a planar grid 68 which has a perimeter frame 69 and a plurality of mating metal wires forming a mesh shown at 70 and 71.

Pieces of food are adapted to be held between the respective wire meshes 70 and 71 which are held in a close position by wire clips 72.

The food holding means 68 has a pivot support 73 at one side and 74 at the other each of which is arranged to be supported in housing 75 and 76 which is secured to the upper surrounding rim 77 of the deep box 61.

There is an electric drive motor 78 which is coupled by inter-connection 79 to continuously rotate the food holding means 68 about the axis as defined by the members 73 and 74 in which way, the food held between the meshes 70 and 71 is effectively carried through half the path below the perimeter rim of the deep box 61 and subject to the secondary radiation of the sides and at the same time while there is less basting from food above, there is a significant amount of this so that once again there is the advantage of the arrangement described.

Having now described in general terms the preferred embodiments, it will be appreciated that the significant advantages discussed are now achievable.

For the same area and general equipment level of previous devices, it is now possible to cook with the excellent flavour possibilities of charcoal cooking twice and indeed more that twice the quantity of food that has been hitherto possible all within the same general period of time so that it will be seen there is a very significant advantage achieved.

In use, especially with the wire grids holding the food, it will be seen that these can be lifted out separately from time to time where the grid to be removed or placed in position is uppermost with the other grids being then to the side and lowermost so that the pivotal support is stable and will hold the frame accordingly.

With respect to the third embodiment, the attitude of each of the grids with respect to the pivot axis can of course be altered and in that drawing, there is shown one of the grids at an angle which is different to the rest.

This has been chosen simply for point of illustration and in practice it would not be used this way unless there is different type of food in one of these as compared to the other.

However it shows the possibility by which various cooking modes can be used while still using the general good principles of the invention.

I claim:

1. A barbecue of a type which holds food to be cooked above a heat source, characterized according to this invention in that there is provided a deep box comprising a base and confining sides having an upper perimeter, means within the base to support burning coals across the base to provide the heat source, and food holding means pivotally supported for rotation about a pivot support axis and adapted to hold separate pieces of food symmetrically about the pivot support axis of the food holding means, the food holding means including a support frame comprising a plurality of opposed support arms arranged to separably support food holding grids, said support arms radially extending from said pivot support axis adjacent lateral extremities of said food holding means at axially spaced positions along said pivot support axis, each of said food holding grids being separably mounted between an associated pair of opposed support arms for pivotal rotation about an arm pivot axis which is parallel to the pivot support axis, each of said food holding grids comprising a pair of unconnected framed grid members adapted to be assembled in overlying relationship with the food to be cooked therebetween for mounting between its associated pair of opposed support arms during cooking, each of said pairs of framed grid members being retained in said assembled overlying relationship during cooking solely by the mounting thereof between said support arms, and said framed grid members of each pair being detached and freely separable from one another upon dismounting from said support arms to allow access to the food.

2. A barbecue as in claim 1 further characterized in that four pairs of said framed grid members are provided and four pairs of said opposed support arms are provided, said support arms having a channel shape sized to receive a lateral peripheral extremity of the assembled pair of framed grid members and to retain the framed grid members in the assembled overlying relationship.

3. A barbecue as in claim 1, further characterized in that each of said pairs of opposed support arms provides a spaced pair of channels for receiving the opposed lateral extremities of its associated pair of framed grid members, and lock means are provided to secure said lateral extremities within said channels.

4. A barbecue as in claim 1 further characterized in that each of said support arms has a thickness substantially corresponding with the maximum thickness of the food holding grid mounted thereon, said support arms comprising substantially the only structure of said food holding means for mounting and engaging said food holding grids.

5. A barbecue as in claim 1 further characterized in that the deep box and food holding means are constructed and arranged such that during rotation of the food holding means about its pivot support axis, the food held thereby will be carried along a path such that substantially half of said path is below the perimeter and between the surrounding sides and for the remainder of the path above the perimeter of the said sides, and motor drive means are provided to effect continuous rotation of said food holding means about its pivot support axis.

6. A barbecue of a type which supports food to be cooked above a heat source characterized according to this invention by including four sides and a base providing a rectangular deep box with means within the box to support across the bottom of the box burning coals, food holding means to support a plurality of separate pieces of food to be cooked, said food holding means comprising four metal grid assemblies each supported in a removable manner with respect to a support frame mounted for pivotal movement about a pivot support axis, the support frame including four radially extending arms adjacent each lateral extremity thereof, each arm providing a pivotal support channel for an end of an associated grid assembly, and pairs of channels cooperating to mount an associated grid assembly for pivotal movement about an arm pivot axis which is parallel to the pivot support axis, each grid assembly comprising a pair of unconnected framed grid members adapted to be assembled in overlying relationship with the food to be cooked therebetween for mounting between its associated pair of said pivotal support channels, each of said pairs of framed grid members being retained in said assembled overlying relationship during cooking solely by the mounting thereof between said support arms, said framed grid members of each pair being detached and freely separable from one another upon removal from said pivotal support channels.

7. A barbecue as in claim 6 further characterized in that said pivotal support channels engage only the adjacent lateral extremities of said grid assemblies.

8. A barbecue as in claim 6 or 7 further characterized in that each of the support arms and pivotal support channels has a thickness substantially corresponding with the thickness of the associated grid assembly.

9. A barbecue as in claim 6 further characterized in that lock means are provided to secure said grid assemblies in said pivotal support channels.

10. A barbecue as in claim 6 further characterized in that each of said framed grid members comprises a perimeter frame peripherally surrounding a screen mesh and said pivotal support channels are adapted to receive and engage overlying portions of said perimeter frames to mount an associated grid assembly.

11. A barbecue as in claim 10 further characterized in that each of said overlying portions of said perimeter frame which is adapted to be received and engaged by said pivotal support channels has a thickness substantially equal to the bight width of said pivotal support channel.

* * * * *